(12) United States Patent
Dresher (10) Patent No.: US 8,925,450 B2
(45) Date of Patent: Jan. 6, 2015

(54) VARIABLE DENSITY PRE-COMPRESSION CHAMBER

(75) Inventor: Michael J. Dresher, Wichita, KS (US)

(73) Assignee: AGCO Corporation, Duluth, GA (US)

( * ) Notice: Subject to any disclaimer, the term of this patent is extended or adjusted under 35 U.S.C. 154(b) by 485 days.

(21) Appl. No.: 13/325,512

(22) Filed: Dec. 14, 2011

(65) Prior Publication Data

US 2012/0186465 A1 Jul. 26, 2012

Related U.S. Application Data

(60) Provisional application No. 61/423,226, filed on Dec. 15, 2010.

(51) Int. Cl.
*A01F 15/04* (2006.01)
*A01F 15/10* (2006.01)

(52) U.S. Cl.
CPC ......... *A01F 15/101* (2013.01); *A01F 2015/102* (2013.01)
USPC .............................. 100/188 R; 100/7; 100/220

(58) Field of Classification Search
USPC ................. 100/7, 178, 187, 188 R, 189, 220; 56/341, 343
See application file for complete search history.

(56) References Cited

U.S. PATENT DOCUMENTS

| | | | | |
|---|---|---|---|---|
| 2,660,949 A | * | 12/1953 | Russell | 100/187 |
| 4,157,643 A | * | 6/1979 | White | 56/341 |
| 4,656,938 A | * | 4/1987 | Webb et al. | 100/189 |
| 6,425,234 B1 | | 7/2002 | Krone et al. | |
| 6,474,228 B1 | | 11/2002 | Leupe et al. | |
| 6,546,705 B2 | | 4/2003 | Scarlett et al. | |
| 6,647,706 B2 | | 11/2003 | Vogt et al. | |
| 6,651,416 B2 | | 11/2003 | Trelstad et al. | |
| 7,047,719 B2 | | 5/2006 | Dubois | |
| 2005/0072133 A1 | * | 4/2005 | Dubois | 56/341 |
| 2011/0023437 A1 | | 2/2011 | Kendrick et al. | |

* cited by examiner

*Primary Examiner* — Jimmy T Nguyen (57) ABSTRACT

In one embodiment, a stuffer system for a baler, the stuffer system comprising: a pre-compression chamber used to transport crop material to a plunger; and plural stuffer arms having coupled to the plural stuffer arms a retractable fork, each of the plural stuffer arms pivotable about an axis and driven in a clockwise and counterclockwise shared path by a first motive apparatus, the fork driven by a second motive apparatus, the fork and stuffer arm independently controlled, wherein the first and second motive apparatuses cause the plural stuffer arms and the fork, upon engagement, to advance plural crop material charges along the pre-compression chamber before delivering the plural charges to the plunger.

14 Claims, 8 Drawing Sheets

VARIABLE DENSITY PRE-COMPRESSION CHAMBER

RELATED APPLICATION

Under provisions of 35 U.S.C. §119(e), Applicant claims the benefit of U.S. Provisional Application No. 61/423,226 filed Dec. 15, 2010, which is incorporated herein by reference.

TECHNICAL FIELD

The present disclosure generally relates to a baler, and in particular, a stuffer system of the baler.

BACKGROUND

Baling operations can follow combine harvester operations. For instance, a baler may be towed by a combine harvester or by a tractor to gather cut crops such as plant stalks from a field to form the plant stalks into round or square bales. Biomass fuels such as straw, hay, or cereals may be pressed into bales to increase their energy density.

SUMMARY

In one embodiment, a stuffer system for a baler, the stuffer system comprising: a pre-compression chamber used to transport crop material to a plunger; and plural stuffer arms coupled to a retractable fork, each of the plural stuffer arms pivotable about an axis and driven in a clockwise and counterclockwise shared path by a first motive apparatus, the fork driven by a second motive apparatus, the fork and stuffer arms independently controlled, wherein the first and second motive apparatuses cause the plural stuffer arms and the fork, upon engagement, to advance plural crop material charges along the pre-compression chamber before delivering the plural charges to the plunger.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Certain embodiments of a stuffer system for a baler and associated controls are disclosed. The stuffer system comprises plural stuffer arms and a retractable fork coupled to the arms, the fork engaging crop material (e.g., biomass picked up from a harvested field) at a receiving end of a pre-compression chamber and ultimately, through movement of the stuffer arms, advancing the crop material to the baler plunger for further compaction and twining of a bale. Control of the fork retraction is independent of the stuffer arm control, enabling dynamic adjustment of stuffer stroke relative to the plunger stroke (e.g., for pre-compression of the crop material) and/or more efficient collection of crop material from the receiving end of the pre-compression chamber and disposition to the plunger. In some embodiments, the stuffer system comprises load sensing capability at the holding fingers, the fork, and/or the stuffer arm(s), the sensed load fed back to control logic for real-time or near real-time display, monitoring, and/or adjustment (e.g., automatic and/or via operator control) of accumulated charge density in the pre-compression chamber.

Unlike conventional stuffer assemblies that use the same control mechanism and unified assembly to both advance the stuffer arm and extend and retract the fork, certain embodiments of the disclosed stuffer systems independently control the stuffer arm swing and the fork extension/retraction movements, enabling not only 1:1 ratios of stuffer arm stroke to plunger stroke, but also enabling N:1 ratios (e.g., where N is a value greater than one, such as 2, 3, etc.), which may improve the density of the cumulative charges (e.g., flakes) provided from the stuffer system to the plunger, improving the resultant bale density and/or uniformity. Further, providing a load sensor toward the top of the pre-compression chamber and/or on the stuffer arm assembly (e.g., the assembly including the stuffer arm and coupled fork) may enable a more dynamic and/or accurate reading of the density of the crop material charges as opposed to a load sensor located toward the bottom of the pre-compression chamber.

The following detailed description refers to the accompanying drawings. Wherever possible, the same reference numbers are used in the drawings and the following description to refer to the same or similar elements. While certain embodiments of the disclosure may be described, modifications, adaptations, and other implementations are possible as should be understood by one having ordinary skill in the art in the context of the disclosure. For example, substitutions, additions, or modifications may be made to the elements illustrated in the drawings, and the methods described herein may be modified by substituting, reordering, or adding stages to the disclosed methods. References hereinafter made to certain directions, such as, for example, "front", "rear", "left" and "right", are made as viewed from the rear of the baler looking forwardly.

Figure 1:
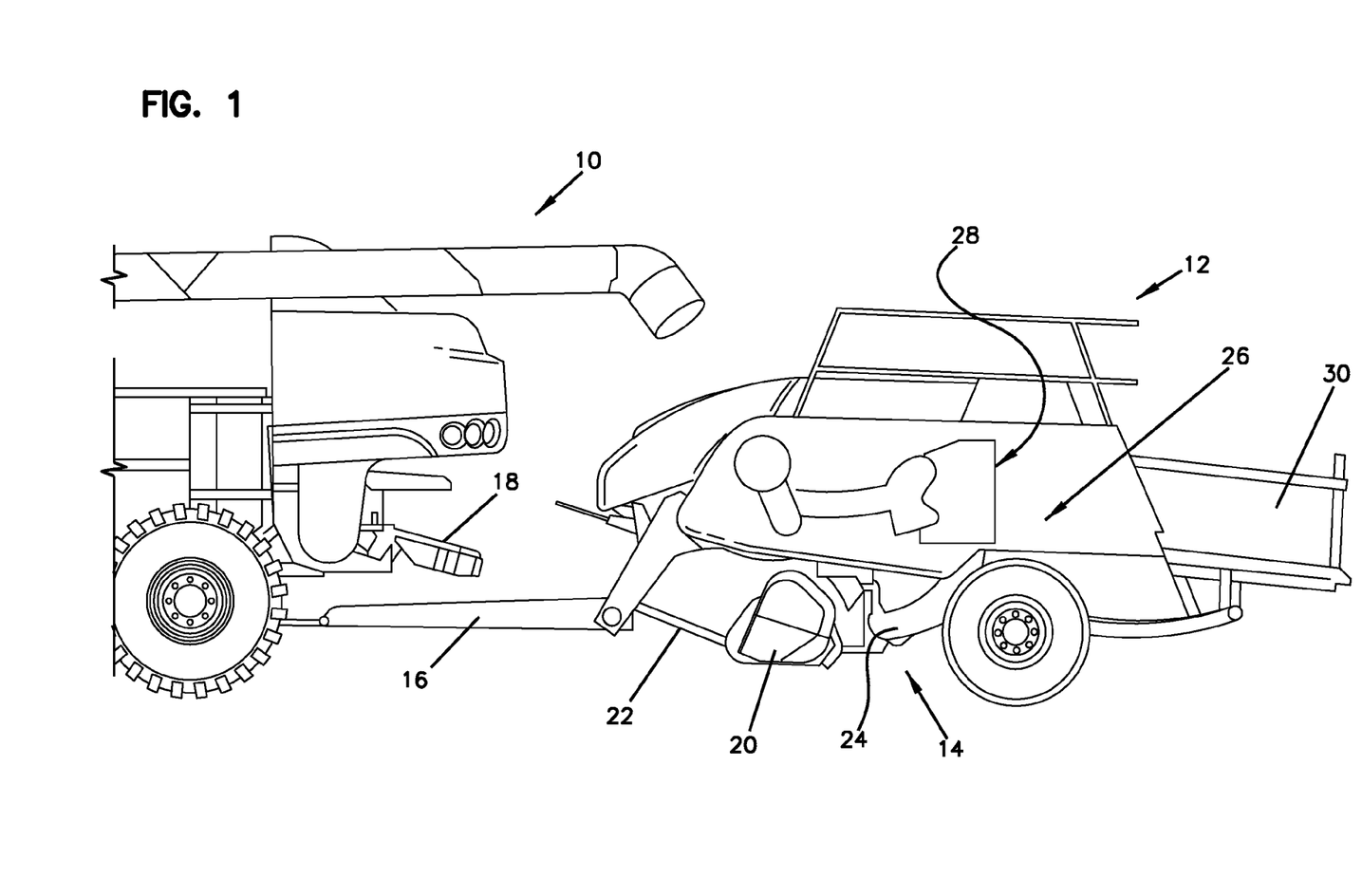
FIG. 1 is a schematic diagram of an example baler towed by a combine harvester in which an embodiment of a stuffer system may be employed.

Referring to FIG. 1, shown is an example combine harvester 10 (herein, also referred to as a combine) and baler 12 towed by the combine 10, the baler 12 housing certain embodiments of the stuffer system 14. It should be understood by one having ordinary skill in the art, in the context of the present disclosure, that the example components illustrated in FIG. 1 are merely illustrative, and should not be construed as implying any limitations upon the scope of the disclosure. For instance, in some embodiments, a tractor or other vehicle may be used to tow the baler 12, or in some embodiments, the baler 12 may be self-propelled. The baler 12 in the illustrated embodiment is pivotally attached to the rear of the combine 10 via a tongue 16, which is coupled to a hitch point located at the rear of the combine 10. As is known, the baler 12 may be powered by a hydrostratic motor affixed to a flywheel of the baler 12 drawing its power source from an engine of the combine 10 via, for instance, a hydrostatic pump.

In some implementations, the tongue 16 may be coupled to the combine 10 in a manner that enables crop material from the combine 10 to be transferred from the combine 10 directly to the baler 12 without redirection through the air by the combine 10 and without the use of a conveyor (or other transfer mechanism) coupled to either the combine 10 or the baler 12. For instance, the combine 10 may disburse crop material from a tailboard 18 at an angle of trajectory that enables the crop material to fall onto a component (e.g., pan) of the baler 12, the crop material then transferred to a pickup 20 of the baler 12 via a transfer pan 22. In some embodiments, other mechanisms of crop pickup may be used. For instance, the crop material may be lifted or received from the ground with the pickup 20. The pickup 20 may be a rotating drum-type mechanism with flexible tines or teeth for lifting and conveying crop material from the ground to the baler 12. Packing forks (not shown) can grab at least a portion of the crop material collected on the transfer pan 22 and move the crop material back to a pre-compression chamber 24 (also referred to as a chute) of the stuffer system 14.

As explained in further detail below, the stuffer system 14 comprises plural stuffer arms coupled to a fork that, upon actuation by respective motive apparatuses, cooperatively deliver the crop material as a flake or charge (or plural charges) through the pre-compression chamber 24 past a top, retractable opening of the pre-compression chamber 24 to a baling chamber 26. The charge or charges are compressed by a reciprocating plunger 28 (shown in a fragmentary view via a partial cut-away of the baler 12) in cooperation with adjustable baling doors and knotted in the baling chamber 26 for subsequent discharge of a bale 30 from the rear of the baler 12. As the pickup, packing, and plunging operations are known to those having ordinary skill in the art, discussion of the same are omitted hereinafter for brevity.

Figure 2:
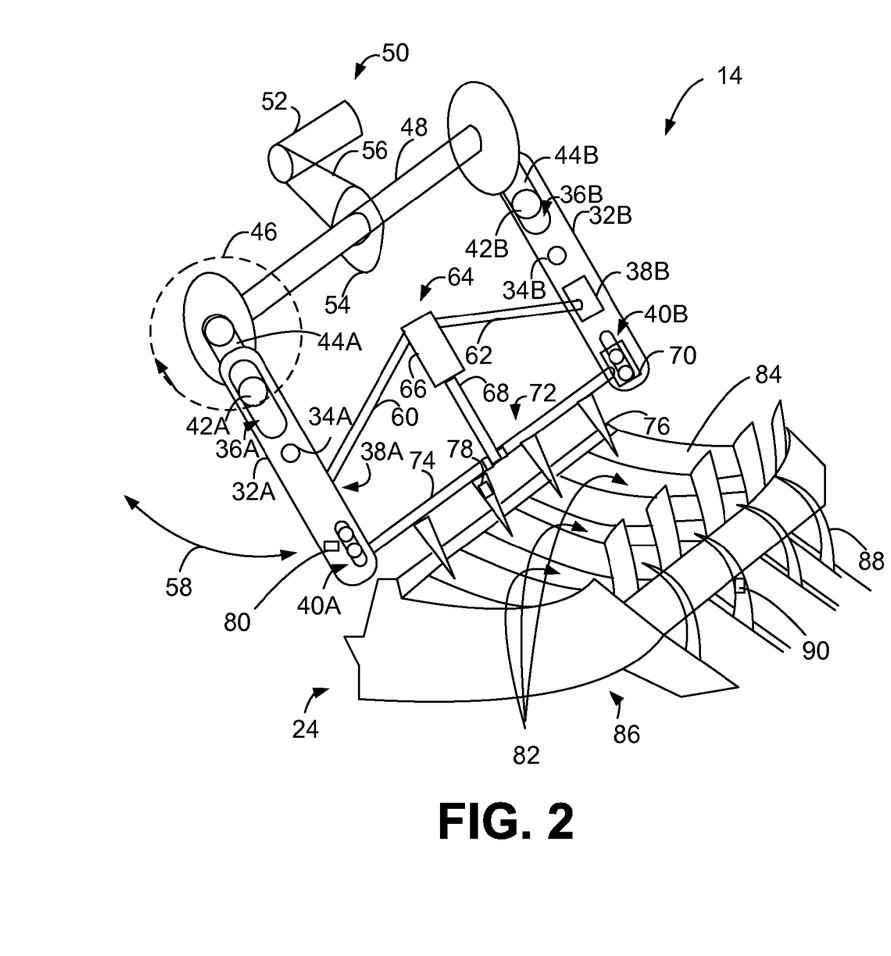
FIG. 2 is a partial perspective view of an example embodiment of a stuffer system.

Having described an example system and/or environment in which a stuffer system may be employed, attention is now directed to FIG. 2, which illustrates one embodiment of a stuffer system 14. It should be understood by one having ordinary skill in the art, in the context of the present disclosure, that the example components illustrated in FIG. 2 are merely illustrative, and should not be construed as implying any limitations upon the scope of the disclosure. For instance, some components and/or structure are omitted from FIG. 2 where either well-known or detailed in association with later-described figures, and some components are illustrated in part, to avoid unduly complicating the drawing. The stuffer system 14 comprises plural (e.g., two) stuffer arms 32A and 32B that are each pivotable about an axis point 34A and 34B, respectively. In some embodiments, a pivot bar may be coupled to, and disposed between, the two pivot points 34A and 34B. The stuffer arms 32A and 32B each comprise a top slot 36A, 36B, a joint 38A, 38B on the inside of each arm 32A, 32B (joint 38A obscured from view for stuffer arm 32A), and a bottom slot 40A, 40B. Though referenced as top and bottom, it should be appreciated in the context of the present disclosure that such terms are not necessarily correlated to each position of the stuffer arms 32A, 32B at every instance in time. For instance, since the stuffer arms 32A, 32B are pivotable about the pivot point 34A, 34B, there are instances during the motion of the stuffer arms 32A, 32B where the top 36A, 36B and bottom slots 40A, 40B are located along the same horizontal plane.

The top slots 36A, 36B are each configured to receive a respective roller 42A, 42B (or roller assembly or equivalent movement-enabling functionality) that are moveable within the boundaries of the respective top slot 36A, 36B. The rollers 42A, 42B are operably coupled to driver arms 44A, 44B, respectively. The driver arms 44A, 44B are driven in a circular or substantially circular rotation 46 (represented by the dashed circular lines, without limitation to whether the direction of movement is clock-wise or counter clock-wise) by rotation of a shaft 48 disposed between, and operably coupled to, the two driver arms 44A, 44B. The shaft 48 is driven by a motive apparatus 50 that is centrally located with respect to the shaft 48 and provides a frictional engagement with the shaft 48, causing rotation of the shaft 48 which in turn drives the driver arms 44A, 44B in the circular path 46. The motive apparatus 50 may comprise a motor 52 (e.g., driven hydraulically, mechanically, or electrically) that couples to a shaft engagement member 54 that has a frictional fit to the shaft 48, the motor 52 driving the shaft engagement member 54 via a coupling link 56 configured as a chain, toothed belt, among other coupling link mechanisms. In some embodiments, the motive apparatus 50 may comprise a gear assembly to drive the rotation of the shaft 48. Note that in some embodiments, the motive apparatus 50 may be located proximal to one of the ends of the shaft 48, or at some position between the center of the shaft 48 and the end of the shaft 48 in some embodiments.

In operation, the rotation of the actuated driver arms 44A, 44B in cooperation with the rollers 42A, 42B causes a fore-and-aft swinging movement 58 of the stuffer arms 32A, 32B about the pivot point 34A, 34B (the pivot points located along the same transverse axis, the axis parallel or substantially parallel to the axis defined by the shaft 48), the fore-and-aft swing 58 occurring along a path shared (e.g., completely) in both directions of the swing.

The stuffer arms 32A, 32B further comprise joints 38A, 38B and bottom slots 40A, 40B. Members 60 and 62 are each coupled on inside ends (e.g., via a flange, bolt attachment, among other known attachment mechanisms) to a motive apparatus 64 configured in the illustrated embodiment as a cylinder located between arms 32A and 32B. The outer ends of members 60 and 62 are rigidly mounted (e.g., bolted, welded, etc.) to the inside surfaces of arms 32A and 32B, respectively, at respective joints 38A, 38B. Note that members 60 and 62 are shown as angled in FIG. 2, but in some embodiments, may each be aligned along an axis that is parallel to axis 48 or other configurations. As is known, the cylinder 64 (motive apparatus 64 and cylinder used interchangeably herein) uses pressurized fluid (e.g., a hydrocarbon-based fluid, though air may be used in some embodiments) to create a linear force and/or motion. For instance, the cylinder 64 may receive pumped fluid under pressure into the base end 66 of the cylinder (hoses not shown), which causes the piston and rod end 68 of the cylinder 64 to advance, while releasing of the fluid of the base end 66 of the cylinder 64 causes the rod end 68 to retract.

The bottom slots 40A, 40B each comprise (e.g., shown in slot 40B, whereas only the rollers are shown for bottom slot 40A) a roller assembly 70, which is configured to be accommodated within each slot 40A, 40B, the respective roller assemblies 70 coupled to a fork 72. The fork 72 comprises a rigid member 74 coupled (e.g., bolted, welded, etc.) at each end to the roller assemblies 70, and further coupled to the piston 68 of the cylinder 64 at a location on the member 74 approximately mid-way between the stuffer arms 32A, 32B.

The fork 72 further comprises plural tines 76 distributed along, and coupled to (e.g., welded, or attached via other known mechanisms), the member 74. Though shown in FIG. 2 as comprising four tines 76, it should be understood that the quantity of tines 76 may be greater or fewer than those illustrated in some embodiments. In one embodiment, at least one of the tines 76 comprises a load sensor 78 coupled thereto (or integrated within the tine 76) for sensing the load of crop material engaged by the tines 76. In some embodiments, there may be additional tines 76 equipped with load sensors, and in some embodiments, the load sensor 78 may be omitted from the tine(s) 76.

In operation, the cylinder 64 acts to extend the fork 72 into and out from (e.g., retractable) a passageway defined by the pre-compression chamber 24. Since control of the movement of the fork 72 is via the cylinder 64, and since the cylinder 64 is separate from the motive apparatus 50 associated with the stuffer arm movement, the control of the fork movement is independent of the control of the stuffer arm movement.

Although one embodiment may employ a load sensor 78 on one or more tines 76, in some embodiments, one or both of the stuffer arms 32A, 32B may be configured with a load sensor coupled thereto (or integrated within), such as the load sensor 80 shown coupled to the stuffer arm 32A. The location of the load sensor 80 as shown in FIG. 2 is merely illustrative, and other locations along the stuffer arm 32A (and/or stuffer arm 32B) are contemplated. Further, in some embodiments, the load sensors 78 and 80 may both be utilized, while in some embodiments, one of the load sensors 78, 80 may be employed in lieu of the other. Additionally, in some embodiments, both sensors 78 and 80 may be coupled to the stuffer system 14 yet conditionally actuated (e.g., one on stand-by) by an operator (such as controlled by an operator at a console) or automatically based on the transpiring of certain conditions. For instance, one of the load sensors 78 or 80 may be in active operation and, responsive to a failure of the sensor 78 or 80, an accompanying warning signal may be triggered with an accompanying display at a graphical user interface (GUI) at the operator console. The GUI may be configured to enable the operator to activate the other stand-by sensor 78 or 80. In some embodiments, failure of one of the sensors 78 or 80 (when the other is on stand-by) may automatically trigger activation of the other sensor (e.g., similar to operation as a back-up or redundant system). Likewise, both of the sensors 78 and 80 may be in active operation and failure of one or the other may trigger an alert at the GUI. Other variations and methods of operation for the sensors 78 and 80 are contemplated to be within the scope of the disclosure, including averaging (e.g., by control circuitry or logic) of the information from the sensors 78 and 80 to obtain, perhaps, a more conservative estimate of the charge density.

The stuffer system 14 further includes the pre-compression chamber 24 as briefly indicated above. The pre-compression chamber 24 is configured with slots 82 that allow the fork tines 76 to extend into a passageway (defined by a top surface 84 of the pre-compression chamber 24 and a bottom surface 86) of the pre-compression chamber 24 to engage crop material and advance the crop material proximal to the top of the pre-compression chamber 24. Entry of the crop material to the baling chamber 26 for compression by the reciprocating plunger 28 is conditionally (e.g., intermittently) obstructed by holding fingers 88 located proximal to the top of the pre-compression chamber 24 and extending, in one embodiment, completely across the passageway of the pre-compression chamber 24. The holding fingers 88 are retractable relative to the passageway of the pre-compression chamber 24, and in the illustrated embodiment of FIG. 2, are embodied as plural hooks (though other geometries or devices may be employed in some embodiments) that are coupled to a pivotable shaft (not shown) actuated (e.g., rotated) by a motive apparatus (e.g., hydraulic, electric, mechanical) not shown.

For instance, the holding fingers 88 extend into the passageway (e.g., from the bottom surface 86 in one embodiment, though in some embodiments, extension through the top surface 84 is contemplated in some embodiments) of the pre-compression chamber 24, and are retracted from the passageway of the pre-compression chamber 24 when the pressure sensed by a load sensor (e.g., load sensors 78 and/or 80) is fed back to the associated motive apparatus and indicates that the charge density is suitable for delivering to the plunger 28. With the independence in control between the fork 72 and stuffer arms 32A, 32B, the retraction of the holding fingers 88 may be delayed long enough to accumulate plural charges to improve the density of the crop material in the pre-compression chamber 24. Given the pressure demands on the holding fingers 88 in view of the accumulated charges and improved density, certain embodiments of the holding fingers 88 are more robust than those found in conventional systems.

In some embodiments, one or more of the hooks of the holding fingers 88 may be coupled to (or have integrated therein) a load sensor 90 in addition to, or in lieu of the load sensors 78 and/or 80. In other words, in some embodiments, the load sensing may be achieved by the load sensor 90 of the holding fingers 88 sensing the pressure of the crop material impinging upon the load sensor 90. Similar to the load sensors 78 and 80 described above, status of the load sensor 90 may be monitored and/or processed in similar manner (e.g., for back-up operation, failure detection, GUI monitoring at the console, averaging, etc.). In some embodiments, the load sensor 90 may be omitted.

It should be appreciated within the context of the present disclosure that some embodiments may omit certain features, and/or add more or use different features and/or arrangements of components. For instance, though described with two stuffer arms 32A, 32B, some embodiments may use a more robust, single stuffer arm. Further, though shown with a cylinder 64 coupled to associated members 60 and 62, some embodiments may utilize a pivot arm spanning between the two stuffer arms 32A, 32B where the cylinder 64 is coupled to the pivot arm. In some embodiments, a motive apparatus configured as a device that is not a cylinder 64 may be employed.

Figure 3A:
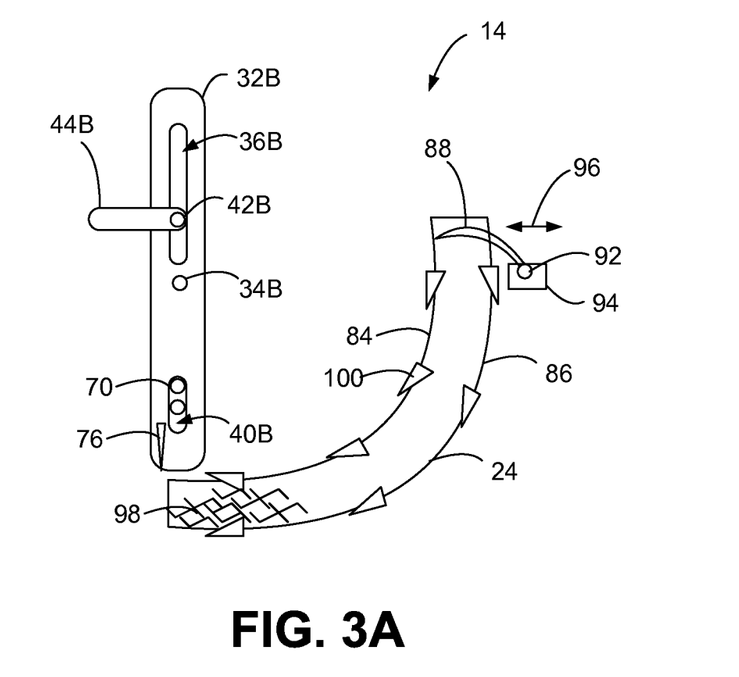
FIGS. 3A, 3B, 3C and 3D are side elevation views of an embodiment of a stuffer system with a stuffer arm and fork in four different positions relative to a pre-compression chamber.
Figure 3B:
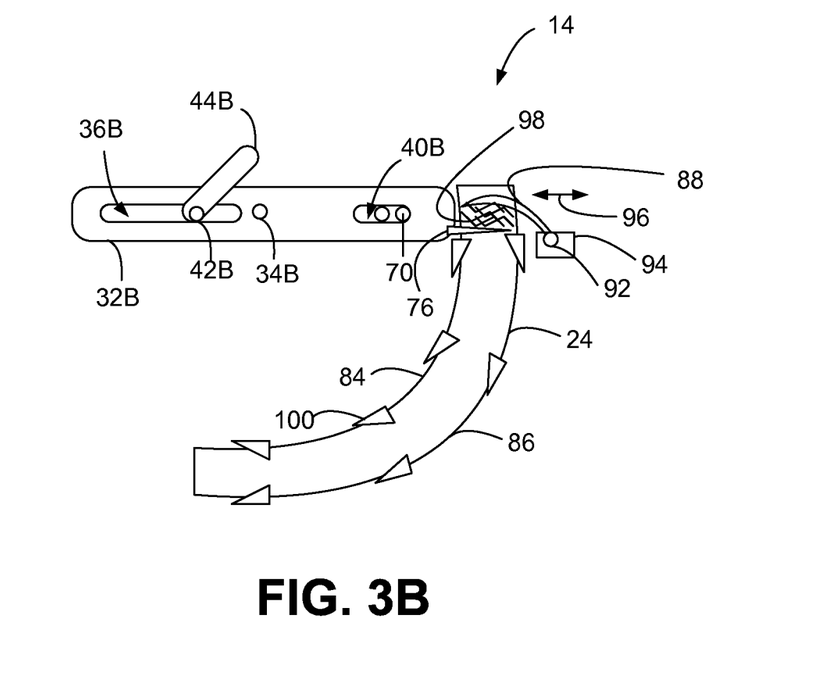

Referring to FIGS. 3A, 3B, 3C, and 3D, shown are side elevation views of a portion of the stuffer system 14 (e.g., left-side views). It should be understood by one having ordinary skill in the art, in the context of the present disclosure, that the example components illustrated in FIGS. 3A-3D are merely illustrative, and should not be construed as implying any limitations upon the scope of the disclosure. In particular, and with reference to FIG. 3A (where the stuffer arm 32B is shown in a vertical orientation) and FIG. 3B (where the stuffer arm 32B is in a horizontal orientation), the stuffer system 14 comprises in one embodiment at least the stuffer arm 32B and the pre-compression chamber 24. It should be appreciated that operations of the right-hand side of the stuffer system 14 are essentially mirrored and contemporaneous in operative employment. As explained above, the stuffer arm 32B comprises the top slot 36B, and bottom slot 40B, as well as a pivot point 34B. The top slot 36B is configured to accommodate a roller 42B that is in operable engagement with the driver arm 44B. The bottom slot 40B is configured to accommodate the roller assembly 70 (the rollers are shown). It should also be understood within the context of the present disclosure that the motion developed by the top slot assembly and motive apparatus 50 may be accomplished with more than one link or linkages driven by a motive apparatus similar to motive apparatus 50. Shown in partial cut-away is a tine 76 of the fork 72 that in FIG. 3A is illustrated in a retracted position relative to the pre-compression chamber 24, and in FIG. 3B is illustrated in an extended position (e.g., extended into the pre-compression chamber 24).

The pre-compression chamber 24 also has extended therein, through the bottom surface 86 and into the passageway of the pre-compression chamber 24, the holding fingers 88 (shown in FIGS. 3A-3B as a single hook, the other hooks obscured from view), which act to conditionally obstruct the flow of crop material to the plunger 28 as described above. In one embodiment, the holding fingers 88 are coupled to a shaft 92, the shaft 92 coupled to a motive apparatus 94 (e.g., hydraulic, electric, mechanical) that actuates the holding fingers 88 (e.g., via rotation of the shaft 92) in a manner that extends and retracts the holding fingers 88 into and out of the pre-compression chamber passageway as described above. The double-headed arrow 96 suggests that the holding fingers 88 extend through the bottom surface 86 and into the pre-compression chamber passageway to obstruct (e.g., completely in some embodiments) the flow of the crop material to the plunger 28. The double-headed arrow 96 further suggests that the holding fingers 88 retract from the passageway and through the bottom surface 86 to allow the passage of crop material 98 past the location previously held by the holding fingers 88 and to the plunger 28.

The pre-compression chamber 24 further comprises a plurality of haydogs (e.g., microhaydogs), such as haydog 100, that extend through the bottom surface 86 and/or top surface 84 such that at least a portion of the haydog 100 extends into the pre-compression chamber 24. Upon the movement of the crop material 98 over the haydogs 100 in the direction toward the top of the pre-compression chamber 24, the haydogs 100 retract from the pre-compression chamber 24. The retracted haydogs 100 return to their extended position, such as by spring-action, once the crop material 98 has passed. The haydogs 100 function to obstruct movement of the crop material 98 in the return direction from the top of the pre-compression chamber 24 to the bottom or entrance (e.g., entrance for receipt of the crop material 98 from the packer or pickup). In one embodiment, the haydogs 100 are spring-loaded, as suggested above. In one embodiment, the haydogs 100 are distributed transversely along a width of the pre-compression chamber 24 at the relative locations coincident with those shown in FIGS. 3A and 3B, though not limited to a symmetric arrangement. For instance, in some embodiments, there may be fewer or more haydogs 100 than those illustrated in FIGS. 3A-3B, and/or their arrangement along the width of the pre-compression chamber 24 may be non-symmetrical relative to one another.

The stuffer arms 32A and 32B (arm 32B shown) cycle back and forth from the lower position of FIG. 3A to the upper position of FIG. 3B. With continued reference to FIGS. 3A and 3B, attention is directed to FIGS. 3C and 3D, which shows the stuffer arm 32B in positions advancing towards the top of the pre-compression chamber 24 according to one half of its swing 58 and returning from the top of the swing 58 back to its base position (vertical orientation). Note that certain features are omitted when compared to FIGS. 3A and 3B for brevity. When a ratio of stuffer strokes relative to plunger strokes other than 1:1 is desired, the fork 72 is retracted from the pre-compression chamber 24 after compressing the biomass material past a given set 102 of haydogs 100, the compression and advancement shown in FIG. 3C (in a snapshot showing the extended position). After the fork 72 (and corresponding tine 76) has been retracted, the stuffer arms 32B (and 32A, though not shown) continue to the top of its cyclical path (past the previous crop or biomass charges 98 and haydog sets 102 to the holding fingers 88) as shown in FIG. 3D before returning to the lower position shown in FIG. 3A.

Note that in some embodiments, one or more load sensors may be located in the pre-compression chamber (e.g., at the bottom surface 86), in addition to, or in lieu of, the load sensors 78, 80, and/or 90.

In operation, and referring again to FIGS. 3A-3B and the stuffer arm 32B (with the understanding that the stuffer arm 32A operation is mirrored), the stuffer arm 32B is actuated and the fork 72 is also actuated by respective motive apparatuses 50 and 64, causing the stuffer arm 32B to pivot about the axis point 34B and the fork 72 to extend toward the pre-compression chamber 24. The fork extension results in the tine 76 extending into the pre-compression chamber 24 and, as the stuffer arm 32B pivots, engage the crop material 98 and move the crop material first engaged at the receiving end (inlet or entrance) of the pre-compression chamber 24 up toward the opposite end (e.g., top) of the pre-compression chamber 24. The crop material 98 presses one or more of the haydogs 100 down as the crop material 98 advances over each haydog 100 in the crop material path, with the pressed-down haydog 100 springing back as the crop material 98 passes.

The crop material 98, if for instance of insufficient density to cause the holding fingers 88 to retract from the pre-compression chamber 24, are stopped at the holding fingers 88 that in one embodiment extend across the pre-compression chamber 24. The haydogs 100 prevent or hinder movement of the crop material back in a return direction toward the receiving end of the pre-compression chamber 24. The stuffer arm 32B then retracts the fork 72, continues whatever is left of its full swing in the upward direction (to the holding finger 88) as explained in association with FIGS. 3C and 3D, and returns to the bottom of the pre-compression chamber 24 to engage an additional charge of crop material 98 that has reached the entrance to the pre-compression chamber 24 as a result of travel of the baler 12, and the process repeats itself in the manner as described.

As explained above, density may be sensed via load sensors 78, 80, and/or 90 (or in some embodiments, via a load sensor located at the bottom surface 86 of the pre-compression chamber 24 in addition to employment of the sensors 78, 80, and/or 90 or in lieu of the sensors 78, 80, and/or 90). When the load of the crop material 98 reaches (or exceeds in some embodiments) a defined threshold load (e.g., as set by an operator according to desired density level or stroke ratio, or in some embodiments programmed into the stuffer system 14), the motive apparatus 94 causes the holding fingers 88 to retract from the pre-compression chamber 24, enabling the stuffer arm 32B in combination with the fork 72 to move the crop material past the point where the holding fingers 88 previously extended into the pre-compression chamber 24, hence enabling the accumulated charge of crop material 98 to be advanced to the baling chamber 26 for further compression by the plunger 28 and formation of a bale 30. Note that in some embodiments, the motive apparatus 94 may be configured to actuate the holding fingers 88 and release accumulated charge to the baler plunger 28 after the sensed density is within a defined range to ensure proper timing of the plunger 28 (e.g., the charge is not released on the wrong side of the plunger).

Depending on the sensed density of the crop material 98 and/or settings applied by an operator, the stuffer arm 32B may repeat the advancement of repeated charges of crop material 98 as explained above, increasing the accumulated charge density, before advancing the crop material past the holding fingers 88. For instance, load sensing data by sensor 78, 80, and/or 90 may be fed back to an operator console (e.g., located at the combine 10), which is displayed in a GUI in the form of density or density indication, enabling the operator to make adjustments to the desired density. Such adjustments can also be automated based on feedback from the load sensors 78, 80, and/or 90. The adjustments may be embodied as speed adjustments (e.g., travel speed), quantity of stuffer arm strokes relative to plunger strokes, among other adjustments.

Note that FIGS. 3A-3B show a retracted position for the tine 76 of the fork 72 in FIG. 3A for a vertical arm orientation, and a fully extended position of the tine 76 of the fork 72 in FIG. 3B for the swing position of the stuffer arm 32B corresponding to advancement to the holding fingers 88. Given the independent control of the fork movement relative to control of the stuffer arm movement, it should be appreciated within the context of the present disclosure that the tine 76 may be extended fully into the pre-compression chamber 24 before advancement of the stuffer arm 32B in a direction toward the holding fingers 88. For instance, such an ability of certain embodiments of the stuffer system 14 enables a more complete "grab" of the crop material 98 from the start of the arm swing.

Figure 3C:
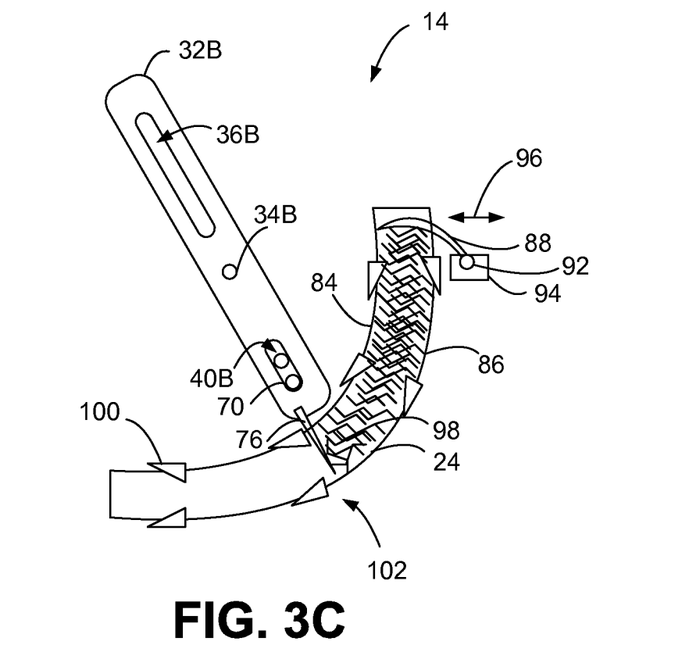
Figure 3D:
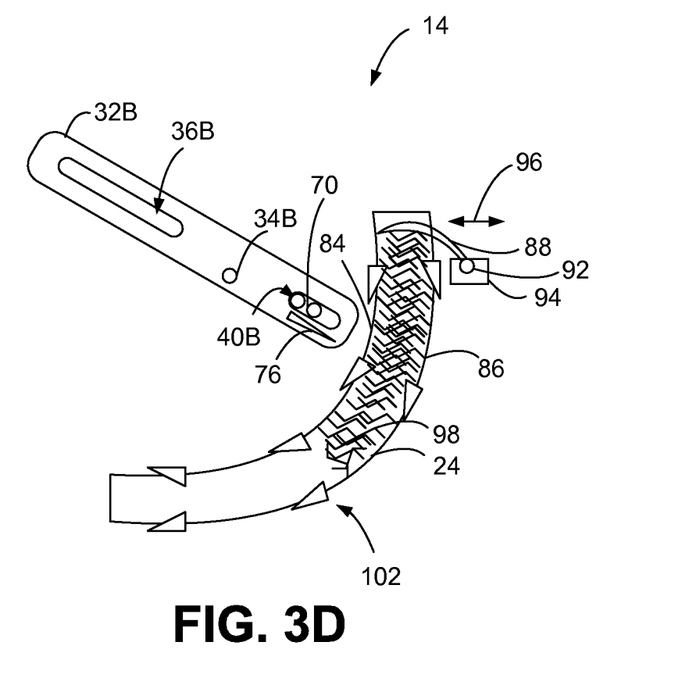

Likewise, at the top (or after a respective charge for ratios different than 1:1, as shown in FIGS. 3C-3D) of the pre-compression chamber 24 (e.g., proximal to the holding fingers 88), the tine 76 may be removed completely from the pre-compression chamber 76 before the stuffer arm 32B begins to return in a direction toward the receiving end of the pre-compression chamber 24, though in some embodiments, the retraction may be gradual as the stuffer arm 32B swings (e.g., pivots) back. In some embodiments, the position of the tine 76 relative to the pre-compression chamber 24 may be more gradual, extending gradually into the pre-compression chamber 24 as the stuffer arm 32B advances from the vertical orientation to the horizontal or near horizontal orientation, and gradual on the return swing as indicated above. In some embodiments, a combination of gradual and immediate extension and/or retraction may be employed in a given arm stroke.

Figure 4:
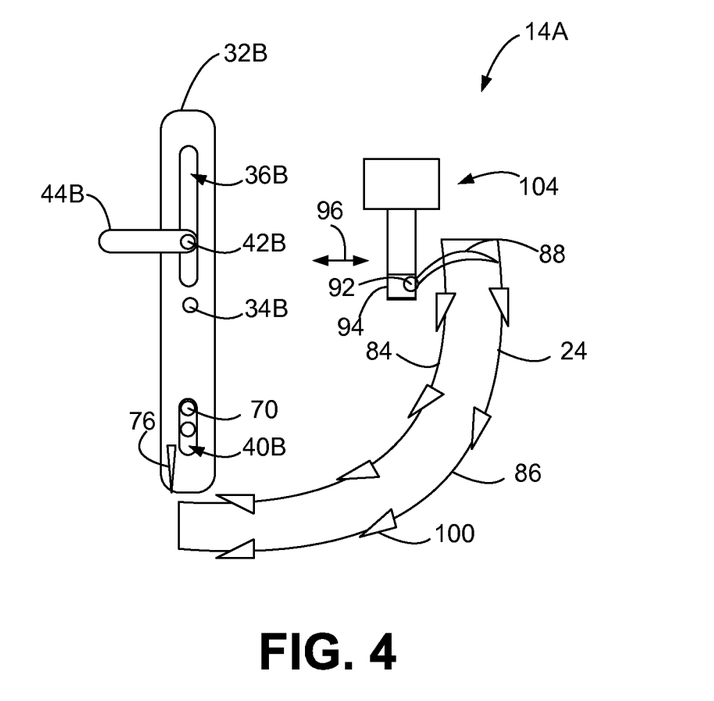
FIG. 4 is a side elevation view of an embodiment of a stuffer system with holding fingers located on an opposite side of the pre-compression chamber compared to its location in FIGS. 3A, 3B, 3C and 3D.

FIG. 4 shows an example alternative arrangement of an embodiment of the stuffer system 14, denoted as stuffer system 14A, where like-numbered components perform the same functionality, and hence the discussion of like-components is omitted for brevity except where helpful to the below description. The example stuffer system 14A provides for the extension and retraction of the holding fingers 88 from the top surface 84 of the pre-compression chamber 24, rather than from the bottom surface 86 as illustrated in FIGS. 3A-3D. For instance, the holding fingers 88, shaft 92, and motive apparatus 94 may be suspended from (or otherwise supported by) a frame 104 of the baler 12, enabling the holding fingers 88 to extend and retract from the side proximal to the stuffer arm 32B (e.g., from the top surface 84). One or more benefits may result from positioning the holding fingers 88 in the manner illustrated, such as reducing the space between the holding fingers 88 and the plunger 28. The extension and retraction of the holding fingers 88 also enables the closing of the pre-compression chamber 24 (by the holding fingers 88) while the plunger 28 progresses or advances across the top of the pre-compression chamber 24. In some implementations, an arrangement of the holding fingers 88 as illustrated in FIG. 4 enables the holding fingers 88 to strip the crop material 98 from the tines 76 of the fork 72 when the fork 72 has advanced proximally to the holding fingers 88.

Figure 5:
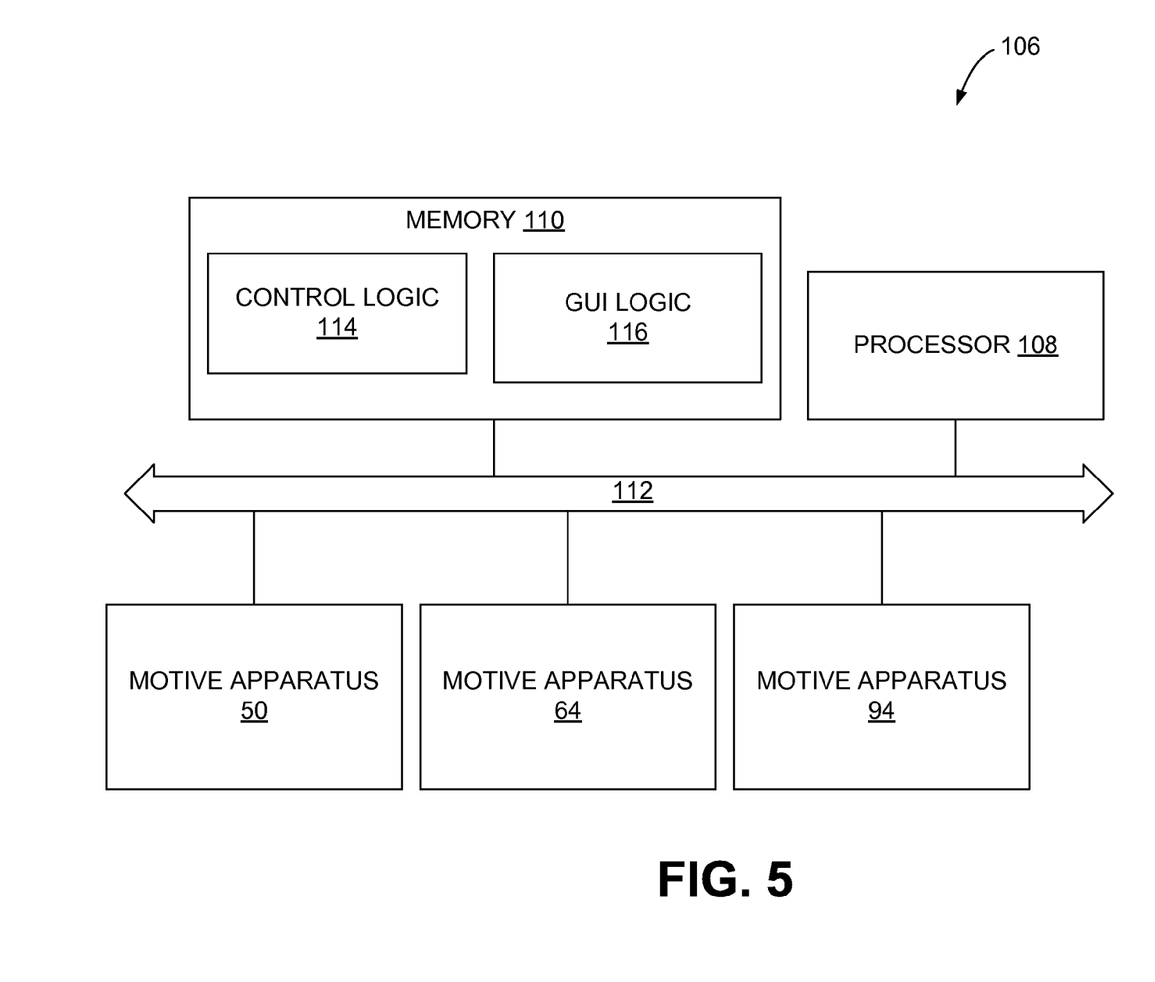
FIG. 5 is a block diagram of an embodiment of a control system of the stuffer system.

Having described example embodiments of a stuffer system 14, attention is directed to FIG. 5, which illustrates an example embodiment of a control system 106 that may be used to control the stuffer system 14 (and 14A, collectively referred to herein as stuffer system 14). It should be understood by one having ordinary skill in the art, in the context of the present disclosure, that the example components illustrated in FIG. 5 are merely illustrative, and should not be construed as implying any limitations upon the scope of the disclosure. Control system 106 comprises one or more processors 108 (one shown), memory 110, and the motive apparatuses 50, 64, and 94 coupled over a network 112. The network 112 may comprise an assembly of wired media, a wireless media, or a combination of both. Signaling over the network may be achieved using 4-20 mA control, on/off switching, and/or using a protocol such as a CAN network protocol or other standard or proprietary communication protocols. In some embodiments, control may be accomplished, at least in part, via pneumatic control. The memory 110 further comprises logic embodied as software, including control logic 114 and GUI logic 116.

The control logic 114 is configured to execute on the processor 108, the processor 108 configured (by the logic 114) to receive information from the load sensors 78, 80, and/or 90 among other sensors (e.g., temperature, moisture, travel speed, etc.), and provide control signaling to the motive apparatuses 50, 64, and 94 (e.g., for adjustment of different parameters, such as stuffer stroke ratio relative to the plunger 28 and/or the stuffer arm 32A, 32B, fork insertion speed and manner of insertion (e.g., gradual, immediate, etc.), and threshold loads for purposes of triggering the opening of the holding fingers 88), among adjustment and/or sensing of other components of operations (e.g., travel speed controls, height adjustments, etc.).

The GUI logic 116 is configured to provide a display of sensed parameters on a display screen (e.g., LCD, CRT, etc.) located on an operator console at, for instance, a driver compartment of the combine 10. With continued reference to FIG. 5, attention is directed to FIG. 6 which illustrates an example GUI 118 provided on such a console by the GUI logic 116. The GUI 118 may provide for an indication of flake or charge density, such as via an incremental bar graph 120, as well as select icons 122 (e.g., left and right arrows, though other icons may be used) that enable an operator to adjust the bale density. Note that the select icons 122 may be operable, upon depression or touch, to cause implementation of the change in density (e.g., via the processor 108 configured by the control logic 114 to receive the signaling from operator depression of the select icons 122 and responsively issuing appropriate instructions to the responsible motive apparatus or apparatuses, or other components of the baler 12 or combine 10 (e.g., engine throttle, etc.)).

Figure 6:
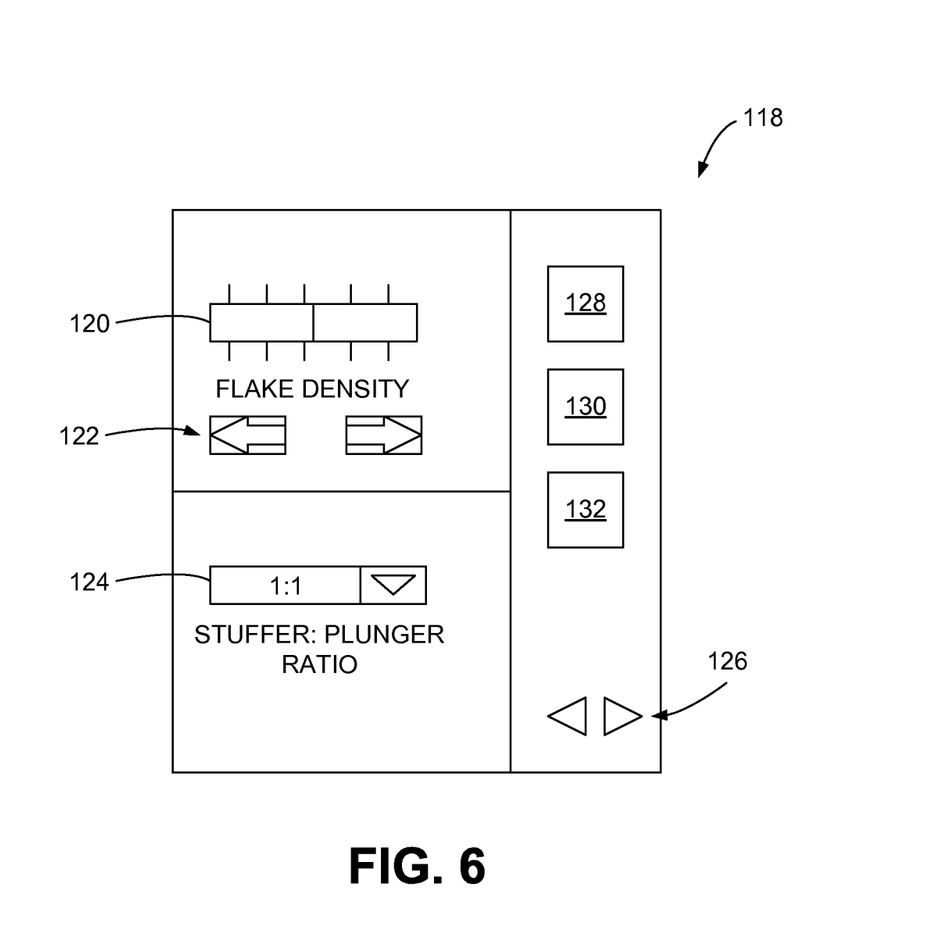
FIG. 6 is a block diagram of an embodiment of an example graphical user interface (GUI) for an operator console that enables monitoring and adjustment of flake density and/or stuffer stroke-to-plunger stroke ratio.

The example GUI 118 further comprises a drop down menu 124 that enables an operator to select a stuffer stroke: plunger stroke ratio. Other screens may be available via selection of page arrows 126. The GUI 118 further comprises selectable status buttons 128, 130, and 132 corresponding to sensor status for sensors 78, 80, and 90, respectively. For instance, a red lighted status button for either one or more of status buttons 128, 130, or 132 may alert the operator of a problem or failure with one of the corresponding sensors. The status buttons 128, 130, and 132 are selectable, prompting upon depression or touch an additional status display GUI (not shown), where a given sensor 78, 80, or 90 may be actuated through operator intervention or information is provided as to the status of the sensor corresponding to the selected button 128, 130, and 132. Note that some embodiments may utilize aural (e.g., verbal commands) control as opposed to use selection by tough. Further, it should be appreciated within the context of the present disclosure that the GUI 118 are contemplated, including fewer or greater numbers of features and/or different features.

Referring again to FIG. 5, in one embodiment, the control logic 114 and GUI logic 116 are embodied as software and/or firmware (e.g., executable instructions) encoded on a tangible (e.g., non-transitory) computer readable medium such as memory 110 and executed by the processor 108 (with or without an operating system). The control logic 114 and GUI logic 116 carries out the interpretations and monitoring of various sensors of the baler 12 and combine 10, including load sensors 78, 80, and 90, and provides an appropriate actuation signal to the motive apparatuses 50, 64, and 94, among other actuated devices that may be adjusted.

Note that actuation and/or control of the motive apparatuses 50, 64, and/or 94 may be implemented, in some embodiments, through one or more intermediate devices (e.g., PLC or other logic controllers) communicatively coupled to the control logic 114. Note that the computer readable medium may include technology based on electronic, magnetic, optical, electromagnetic, infrared, or semiconductor technology. Further note that functionality of the control logic 114 and/or GUI logic 116 may be further distributed among separate but cooperating software modules and/or devices.

Any software components illustrated herein are abstractions chosen to illustrate how functionality may be partitioned among components in some embodiments of the illustrated control system 106 as disclosed herein. Other divisions of functionality are also possible, and these other possibilities are intended to be within the scope of this disclosure. To the extent that systems and methods are described in object-oriented terms, there is no requirement that the disclosed systems and methods be implemented in an object-oriented language. Rather, the systems and methods can be implemented in any programming language, and executed on any hardware platform. Any software components referred to herein include executable code that may be packaged, for example, as a standalone executable file, a library, a shared library, a loadable module, a driver, or an assembly, as well as interpreted code that is packaged, for example, as a class.

In some embodiments, functionality associated with the control logic 114 in whole or in part, may be implemented in hardware logic. Hardware implementations include, but are not limited to, a programmable logic device (PLD), a programmable gate array (PGA), a field programmable gate array (FPGA), an application-specific integrated circuit (ASIC), a system on chip (SoC), and a system in package (SiP). In some embodiments, one or more functionality associated with the control logic 114 may be implemented as a combination of hardware logic and processor-executable instructions (software and/or firmware logic). It should be understood by one having ordinary skill in the art, in the context of the present disclosure, that in some embodiments, one or more functionality of the control logic 114 may be distributed among several devices, co-located or located remote from each other.

Figure 7:
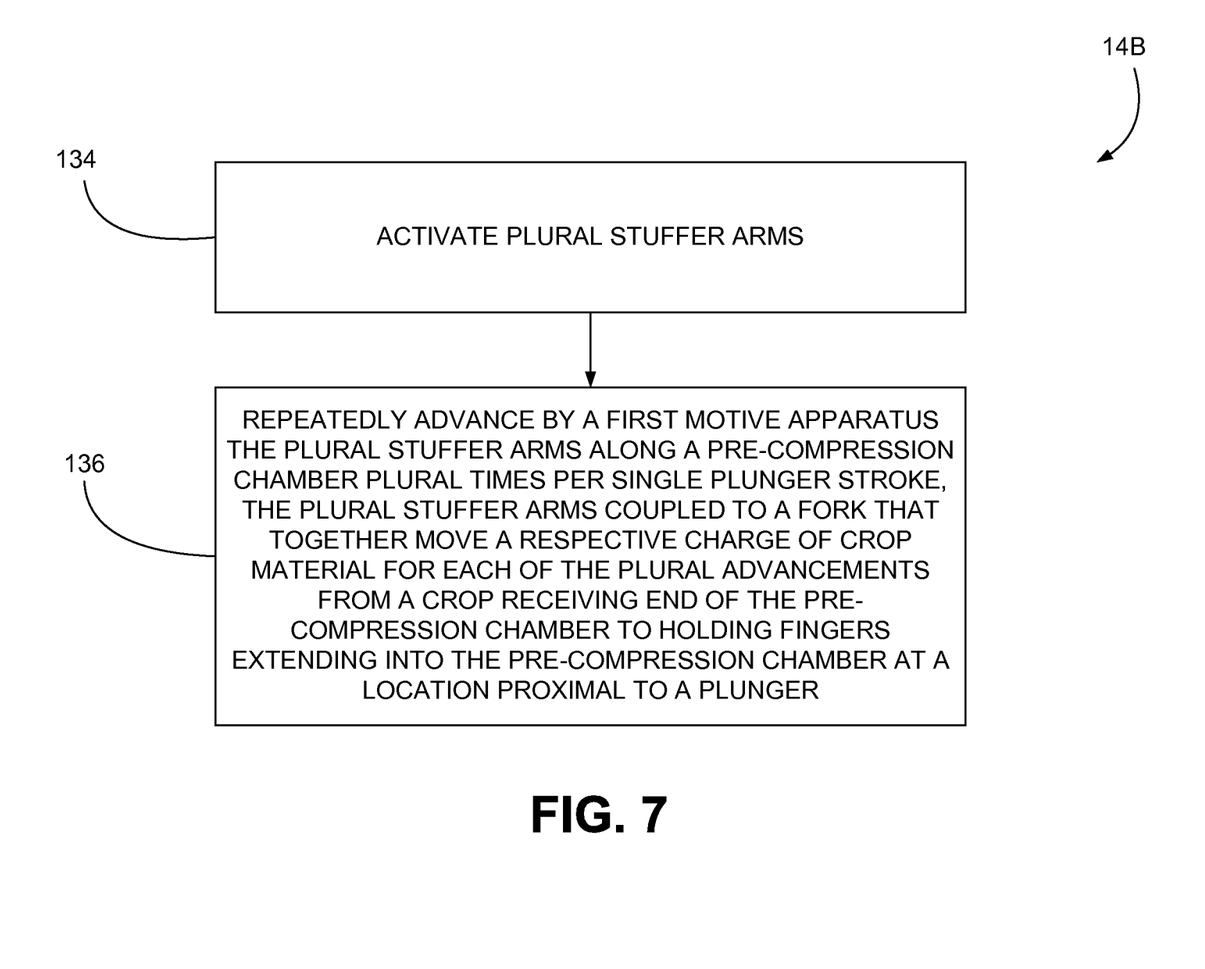
FIG. 7 is a flow diagram that illustrates an example stuffer method embodiment.

Having described certain embodiments of the stuffer system 14 and associated controls, it should be appreciated, in the context of the present disclosure, that one embodiment of a stuffer method 14B, illustrated in FIG. 7, comprises activating plural stuffer arms (134); and repeatedly advancing by a first motive apparatus the plural stuffer arms along a pre-compression chamber plural times per single plunger stroke, the plural stuffer arms coupled to a fork that together move a respective charge of crop material for each of the plural advancements from a crop receiving end of the pre-compression chamber to holding fingers extending into the pre-compression chamber at a location proximal to a plunger (136).

It should be emphasized that the above-described embodiments of the present disclosure are merely possible examples of implementations, merely set forth for a clear understanding of the principles of the stuffer system embodiments. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A stuffer system for a baler, the stuffer system comprising:
a pre-compression chamber having a first end for receiving crop material and a second end proximal to a plunger;
plural stuffer arms, wherein each of the stuffer arms is pivotable about an axis point and has coupled to each a retractable fork, the retractable fork engaging the crop material at the first end at a first pivot angle and the second end at a second pivot angle;
a first motive apparatus configured to rotate the stuffer arms about the axis; and
a second motive apparatus configured to extend and retract the fork, the first and second motive apparatuses independently controllable, wherein the second motive apparatus is configured to cause the fork to extend and then retract during a single upward swing caused by the first motive apparatus, the retraction during the single upward swing occurring before a top of the swing.

2. The stuffer system of claim 1, wherein the pre-compression chamber comprises plural retractable haydogs, wherein at least a portion of the plural retractable haydogs extend into the pre-compression chamber at a first instance and retract from the pre-compression chamber at a second instance.

3. The stuffer system of claim 2, wherein the first instance corresponds to return of the crop material in a direction of travel from the second end to the first end.

4. The stuffer system of claim 2, wherein the second instance corresponds to advancement of the crop material in a direction of travel from the first end to the second end.

5. The stuffer system of claim 1, wherein the pre-compression chamber further comprises retractable holding fingers proximal to the second end, the retractable holding fingers, when extended into the pre-compression chamber, blocking advancement of the crop material to the plunger.

6. The stuffer system of claim 1, wherein the pre-compression chamber further comprises retractable holding fingers proximal to the second end, the retractable holding fingers, when retracted from the pre-compression chamber, enabling advancement of the crop material to the plunger.

7. The stuffer system of claim 1, wherein the pre-compression chamber further comprises retractable holding fingers proximal to the second end, the retractable holding fingers retractable in a direction substantially parallel to movement of the plunger.

8. The stuffer system of claim 1, wherein the pre-compression chamber further comprises retractable holding fingers proximal to the second end, the retractable holding fingers retractable from a surface of the pre-compression chamber closest to the stuffer arm.

9. The stuffer system of claim 1, wherein the pre-compression chamber further comprises retractable holding fingers proximal to the second end, the retractable holding fingers retractable from a surface of the pre-compression chamber furthest from the stuffer arm.

10. The stuffer system of claim 1, wherein the retractable fork comprises plural tines.

11. The stuffer system of claim 1, wherein the second motive apparatus is further configured to fully extend the fork at the first end before the plural stuffer arms advance toward the second end.

12. The stuffer system of claim 1, wherein the second motive apparatus is further configured to gradually extend the fork as the plural stuffer arms advance from the first end to the second end.

13. The stuffer system of claim 1, wherein the first motive apparatus is further configured to cause the plural stuffer arms to travel a first path when advancing from the first end to the second end and a second path when returning the arm from the second end to the first end, the first path equal to the second path.

14. The stuffer system of claim 1, wherein the first and second motive apparatuses are hydraulically actuated.

* * * * *